United States Patent

Miller et al.

[11] Patent Number: 5,985,169
[45] Date of Patent: Nov. 16, 1999

[54] OXYGEN SCAVENGING METAL-LOADED HIGH SURFACE AREA PARTICULATE COMPOSITIONS

[75] Inventors: James George Miller, Ellicott City; Thomas Andrew Blinka; Drew Ve Speer, both of Columbia; William Alfred Feehley, Jr., Kingsville, all of Md.

[73] Assignee: W.R. Grace & Co.-Conn., New York, N.Y.

[21] Appl. No.: 08/864,232

[22] Filed: May 23, 1997

[51] Int. Cl.$^6$ .......................... C09K 15/02; C09K 15/04; C09K 3/00
[52] U.S. Cl. .................. 252/188.28; 252/181.1; 423/700; 423/713; 426/271
[58] Field of Search ........................ 252/188.28, 181.1, 252/181.6, 181.7; 423/610, 617, 625, 700, 713; 426/271

[56] References Cited

U.S. PATENT DOCUMENTS

| 3,271,322 | 9/1966 | Stiles . |
| 3,977,901 | 8/1976 | Buzzelli . |
| 4,192,773 | 3/1980 | Yoshikawa et al. . |
| 4,366,179 | 12/1982 | Nawata et al. . |
| 4,524,015 | 6/1985 | Takahashi et al. ................ 252/188.28 |
| 5,798,055 | 8/1998 | Blinka et al. ...................... 252/188.28 |

*Primary Examiner*—Joseph D. Anthony
*Attorney, Agent, or Firm*—Howard J. Troffkin

[57] ABSTRACT

An oxygen scavenging composition composed of a carrier and a metal coated, inert, porous particulate material having the metal substantially in a zero valence state. The composition is contained within the interior cavity of a container to scavenge oxygen therein. The composition may form at least a part of the interior surface of the container or be present therein in the form of a film, mat, sachet or ceramic.

21 Claims, 6 Drawing Sheets

Cu Impregnated TiO$_2$
(12.0 wt% Cu)

Cu Impregnated Silica
(9.8 wt% Cu)

Cu Impregnated TiO2 in PVC
(Wet)

OXYGEN SCAVENGING METAL-LOADED HIGH SURFACE AREA PARTICULATE COMPOSITIONS

BACKGROUND OF THE INVENTION

The present invention relates to polymeric compositions that can be used to retain product quality and improve shelf life of oxygen sensitive materials, and to intermediate shaped structures, e.g., films, coatings, 3-dimensional solids, fibers, webs and the like which contain said composition, as well as to shaped products into or onto which said composition or structure are incorporated or applied to, be part of or attached to the container structure.

The composition is composed of a polymeric composition which contains porous particulate having oxygen scavenging metal contained therein. Specifically, the composition utilizes a high surface area microporous particulates which have been coated with metal atoms selected from magnesium, calcium, tin or one of the transition metals from scandium to zinc or mixtures thereof. The metal coated particulate containing oxygen scavenging composition of the present invention provides effective absorption of oxygen from the interior of a container without adversely affecting the color, taste or smell of the packaged material contained therein. Further, the resulting composition is thermally stable and does not emit volatile by-products to contaminate the packaged material.

The subject oxygen scavenging composition has the ability to effectively chemically combine with oxygen in contact therewith, such as from the interior of a container, without undue migration of the oxygen scavenging metal-coated material out of the matrix. The migration stability of the metal and its metal-coated material is of particular advantage in that it significantly reduces or eliminates adverse effects on the color, taste, or smell of articles in contact with the matrix composition.

In order to enhance preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a shaped container body that is provided with a lid or other separate closure. The polymeric sheet material may constitute some or all of the interior exposed surface area of the container.

It is known to include an oxygen scavenger in sheet material. The oxygen scavenger reacts with oxygen that is trapped in the package or that permeates into the package. This is described in, for instance, U.S. Pat. Nos. 4,536,409 and 4,702,966 and the prior art discussed in these references. U.S. Pat. No. 4,536,409, for example, describes cylindrical containers formed from such sheet material and provided with metal lids.

When the container is formed of a glass or metal body and is provided with a hermetically sealed metal closure, the permeation of oxygen through the body and the closure is theoretically impossible because of the impermeability of the materials forming the body and closure. As a practical matter, metal cans can reliably prevent oxygen ingress. However, some oxygen ingress may occur by diffusion through the gasket or the like positioned between a container body and its lid. It has long been recognized that when conventional containers of these types are used for the storage of oxygen sensitive materials, the shelf life of the stored materials is very limited. The quality of the packaged material tends to deteriorate over time, in part because dissolved oxygen typically is present in the pack from the time it is filled; and in part due to oxygen ingress which occurs during storage.

When the container is in the form of a can, the can end or other closure in many instances includes push components or pull components which are intended to be, respectively, pushed or pulled in order to allow removal of the fluid or other material in the container without removing the entire closure from the container. These push or pull components are often defined by discontinuities or lines of weakness in the panel of the closure. Problems that can arise at these lines of weakness or discontinuities include the risk of permeation of oxygen into the container and the risk of corrosion of the metal where the normal protective lacquer coating is ruptured at the lines of weakness or at the discontinuities.

It would be very desirable to be able to significantly improve the shelf life while continuing to use conventional materials for the formation of the container body, the container closure and, where applicable, the gasket between the body and closure.

Various types of oxygen scavengers have been proposed for this purpose. For example, it is well known to package iron powder in a sachet for use with dry foods. See Mitsubishi Gas Chemical Company, Inc.'s literature titled "Ageless®—A New Age in Food Preservation" (date unknown). However, these materials require the addition of water soluble salts to enhance the oxygen scavenging rate and, in the presence of moisture, the salts and iron tend to migrate into liquids, producing off-flavors. Similarly, U.S. Pat. No. 4,536,409 issued to Farrell et al. recommends potassium sulphite as a scavenger, with similar results. U.S. Pat. No. 5,211,875 issued to Speer et al. discloses the use of unsaturated hydrocarbons for use as oxygen scavengers in packaging films.

It is known in the art that ascorbate compounds (ascorbic acid, its salts, optical isomers, and derivatives thereof) can be oxidized by molecular oxygen, and can thus serve as components of an oxygen scavenging formulation, for example, as a component of a closure compound. For example, U.S. Pat. No. 5,075,362, issued to Hofeldt et al., discloses the use of ascorbates in container closures as oxygen scavengers.

U.S. Pat. No. 5,284,871 issued to Graf relates to the use of an oxygen scavenging composition made of a solution of a reducing agent and dissolved species of copper which are blended into foods, cosmetics and pharmaceuticals. $Cu^{2+}$ ascorbate is used in the examples. The reference indicates that relatively high level of $Cu^{2+}$ (~5 ppm) are required in the food for scavenging to be effective but indicates that small amounts of the $Cu^{2+}$ can combine with oxygen in food to cause food spoilage. In order to avoid spoilage, one is required to reduce the amount of headspace $O_2$ or partially flush the container with an inert gas (Col. 5, lines 32–39). A paper by E. Graf, "Copper (II) Ascorbate: A Novel Food Preservation System", Journal of Agricultural Food Chemistry, Vol. 42, pages 1616–1619 (1994) identifies copper gluconate as a preferred raw material.

It is also well known in the scientific literature (See "Polymer Compositions Containing Oxygen Scavenging Compounds", Teumac, F. N.; et al. WO 91/17044, published Nov. 4, 1991, filed on May 1, 1991) that the oxidation rate of ascorbate compounds can be increased significantly by the use of catalysts. Typical oxidation catalysts for ascorbic acid and its derivatives are water soluble transition metal salts. When such catalysts are combined with an ascorbate compound in a polymeric matrix, e.g., a PVC closure formulation, they are effective in catalyzing the oxidation of the ascorbate compound, and increase the oxygen scavenging rate of the ascorbate.

In each of the above references, the active agents of the oxygen scavenging systems utilize organic materials which would produce by-products (e.g., aldehydes, acids, ketones) of the oxidation process. These by-products are known to adversely effect a wide range of packaged material.

Copper zeolite powders have been used in tubular reactors under relatively high temperature conditions, such as 140° C. or higher, to remove small quantities of oxygen contained in gas streams. See "Activation of Copper Dispersed on a Zeolite for Oxygen Absorption" by Sharma and Secham, *Chem. Modif. Surf.*, 3 (Chem Modif Oxide Surf), 65–80. Agents which perform at such elevated temperatures have not been deemed appropriate for use in food or food container applications, as foods are typically maintained at relatively low temperatures and are not exposed to temperatures above 120° C. for any extended time.

Further, copending U.S. application having U.S. Ser. No. 08/764,874, filed Dec. 3, 1996, teaches that certain zeolites having ion-exchange capacity can be used as an exchange medium whereby copper and other oxygen scavenging metals are adhered to the zeolite by ion-exchange technique. The capacity to scavenge oxygen of the resultant product is substantially limited by the exchange capacity of the material. Thus, because the exchange capacity is normally low, the amount of metal contained in the material is lower than desired to provide a high capacity oxygen scavenging material which can provide extended shelf-life to a product.

It is highly desired to provide an effective oxygen scavenging system suitable for packaging applications which has good oxygen absorption capabilities and capacity and which does not itself or by its by-products, provide material which adversely effects the color, taste or smell of the packaged material.

It is further desired to provide an effective oxygen scavenging system which has the active scavenger agent contained within a carrier and the agent still provides effective scavenging capacity.

It is further desired to provide an effective oxygen scavenging system which is thermally stable and, thereby, capable of allowing the packaged system to undergo pasteurization or sterilization.

SUMMARY OF THE INVENTION

The present invention is directed to an oxygen scavenging composition capable of providing good oxygen absorption capabilities while not adversely affecting the color, taste or smell of material packaged within a container having said composition as a part thereof. The present oxygen scavenging composition is formed of a polymer or the like carrier containing a high surface area, porous particulate material having transition metal coated on a major portion of the particulate material's surface area and in which the metal is substantially in its zero-valence state.

The present invention is further directed to a shaped structure containing or derived from the subject composition.

DETAILED DESCRIPTION

Figure 1:
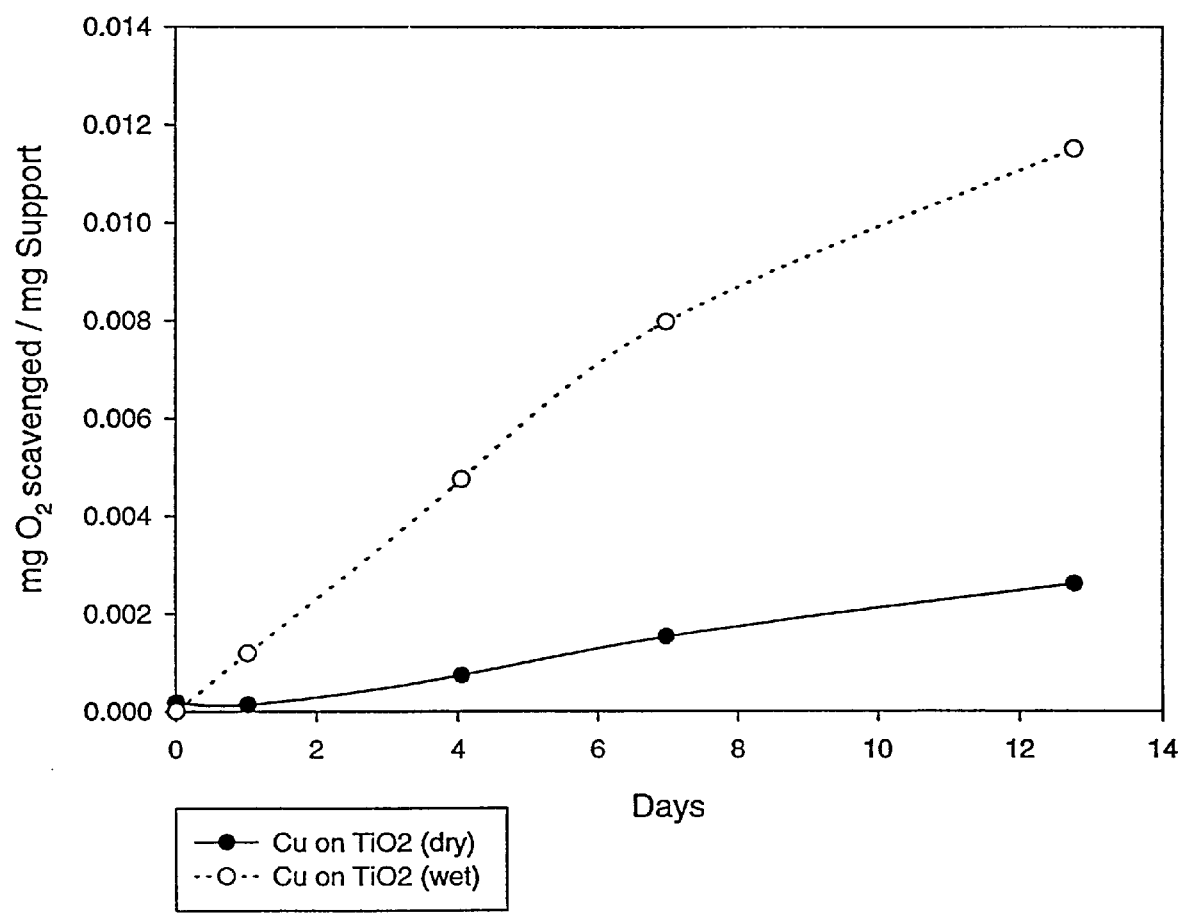
FIGS. 1–5 are each graphic depictions of the oxygen scavenging of the oxygen scavenger metal containing particulate materials of Examples 1–7 respectively. Each Figure shows the comparative values of the scavenging activity under ambient dry and moist conditions.
Figure 2:
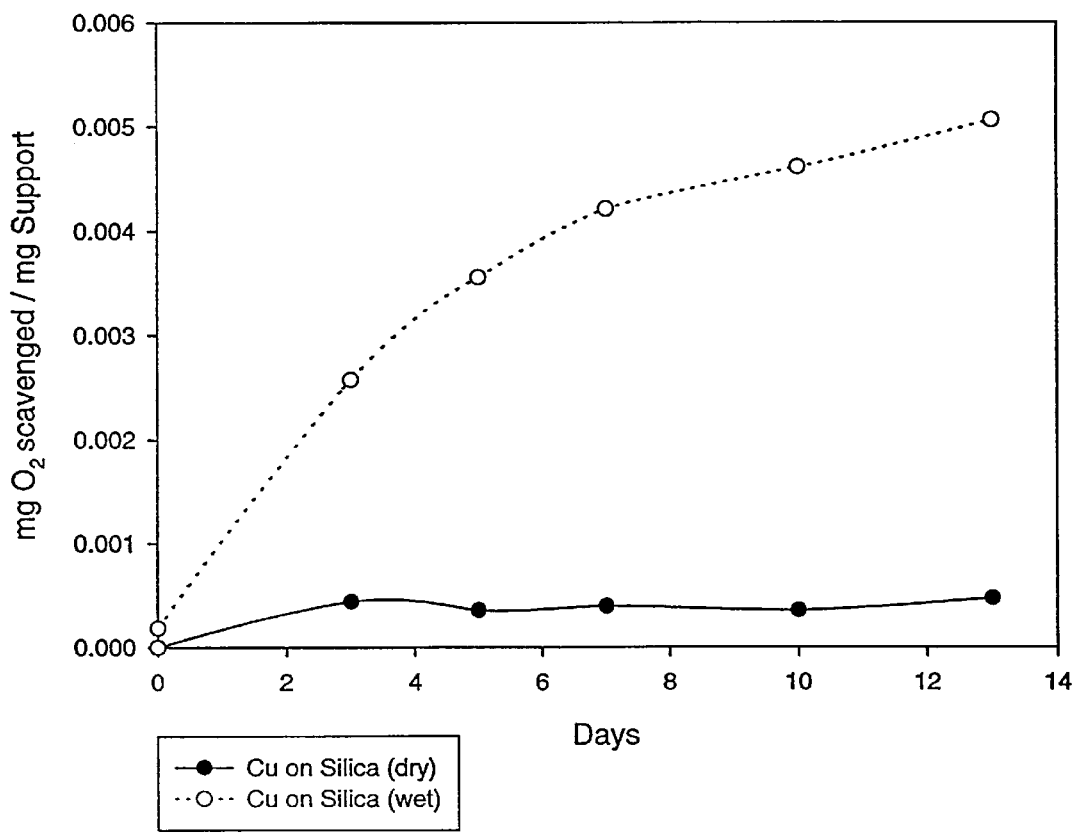
Figure 3:
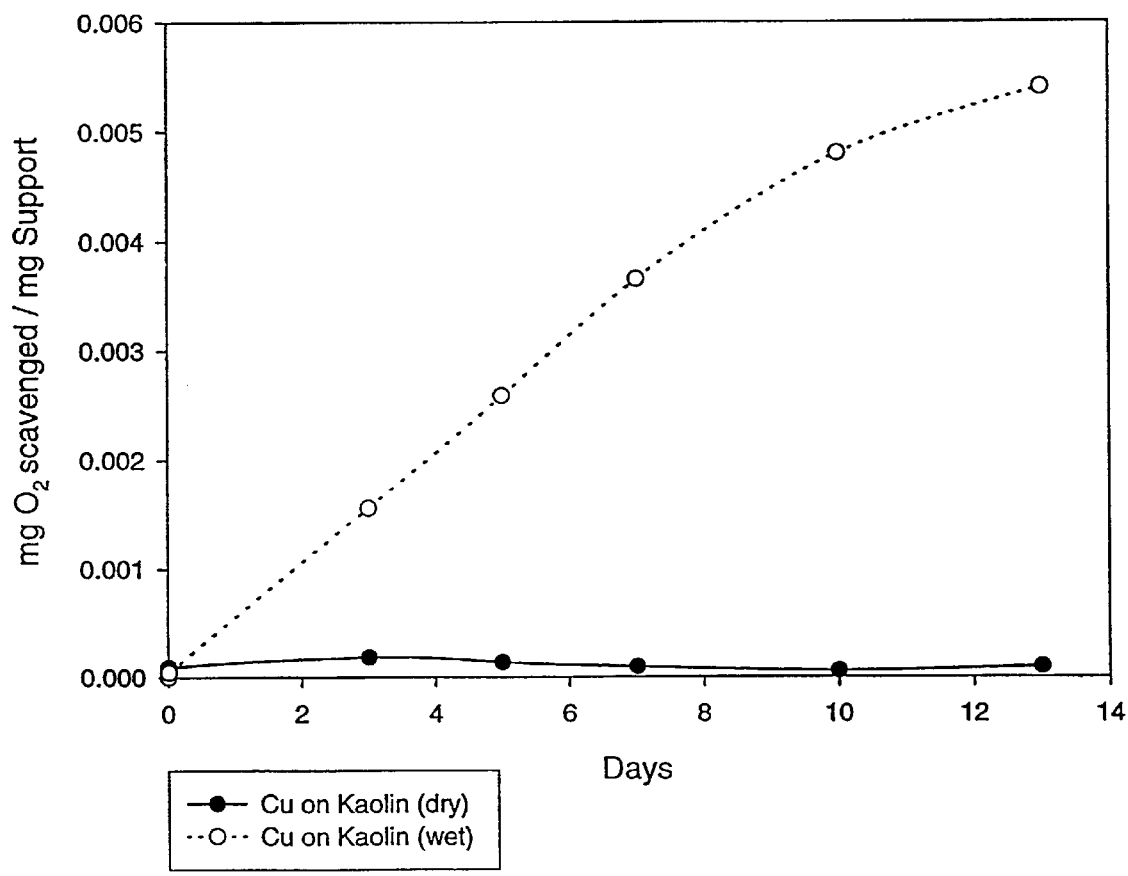
Figure 4:
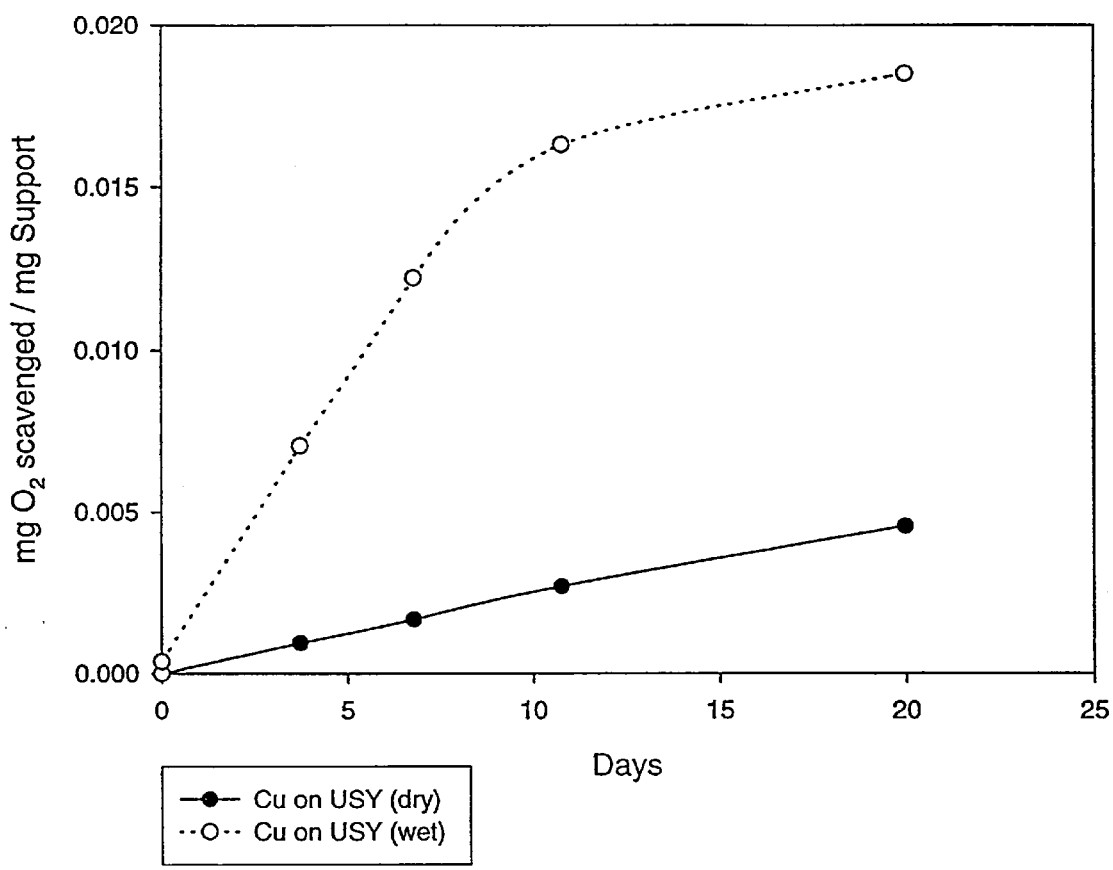
Figure 5:
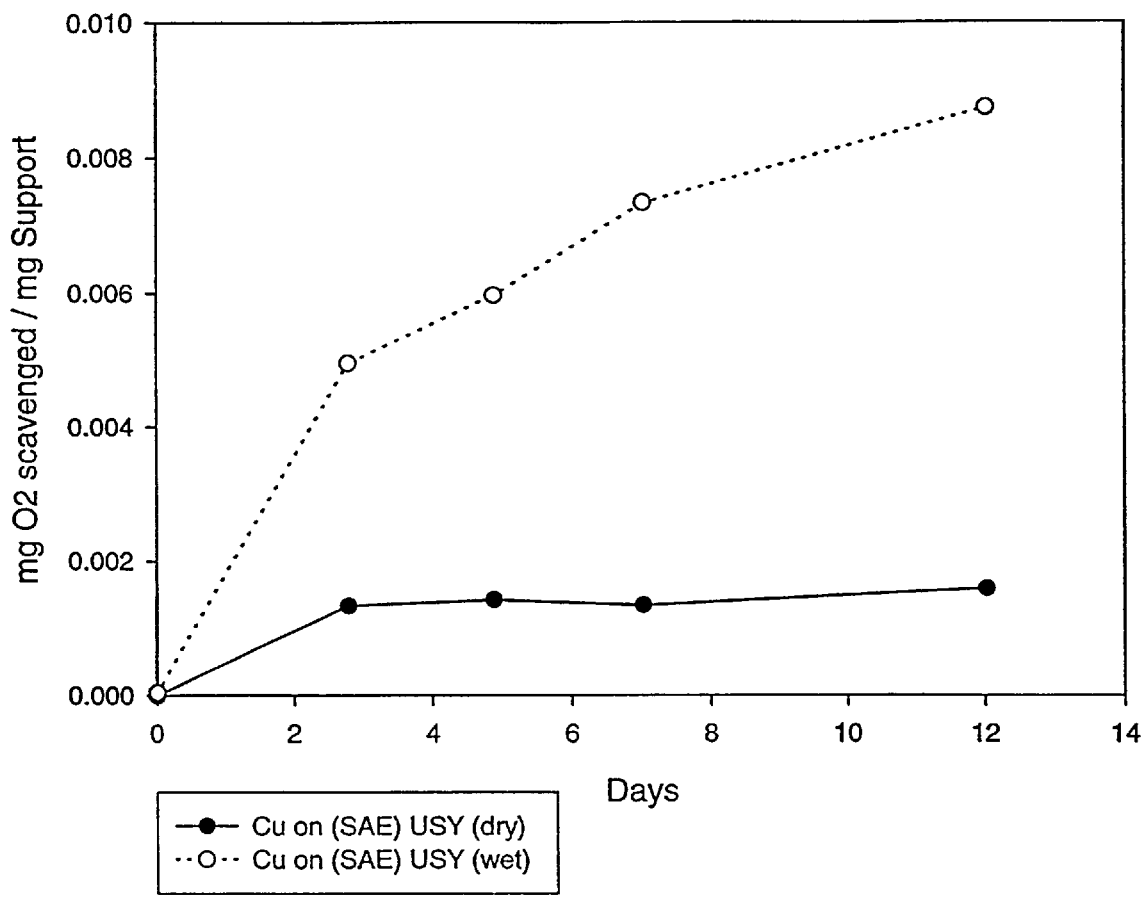

The present invention is directed to an oxygen scavenging composition formed of a carrier having a high surface area, microporous particulate material coated with transition metal and where the metal is substantially in its zero-valence state. The carrier can be a polymer matrix in which the subject micorporous particulate material is substantially uniformly distributed, or a film or mat (woven or non-woven) having the subject microporous particulate material substantially uniformly distributed therein or deposited thereon, or a moisture permeable pouch or sachet which contain the subject metal coated microporous particulate distributed therein.

The present invention further provides an improved container for packaging materials, such as food, beverages and the like, which are susceptible to oxidative degradation. The present improved container is capable of retaining product quality and enhanced shelf life of the packaged material without adversely effecting the color, taste or smell of the packaged material by the present oxygen scavenging composition.

The oxygen scavenging composition of the present invention is composed of a porous particulate material which has a metal coating throughout the surface of the material. The porous particulate material is either distributed throughout the carrier matrix or carried as a coating thereon. The porous particulate material should generally be a high surface area particulate material. The surface area may be from about 1 to 950 square meters per gram with from about 10 to 800 square meters per gram being preferred. The high surface area is provided for by the porosity of the particulate material. The pore volume (BET) of the particulate material is preferably at least about 0.07 cc/gm with from about 0.07 to 4 cc/gm being most preferred. The particulate size of the particulate material should be from about 0.007 to 100 micron diameter with from 0.007 to 5 microns being preferred.

The particulate material may be composed of a material which has a low degree of water solubility or is substantially water insoluble to provide the material which is substantially insoluble and inert with respect to the packaged products of the intended application. The term "inert" as used herein and in the appended claims refers to the characteristic of lack of reactivity with respect to the polymer matrix and the packaged material with which the resultant subject composition is contemplated for use. For example, where the packaged product is organic, the material may have some degree of water-solubility. However, if the packaged product has an aqueous component, the material chosen should be water-insoluble. Where the packaged product contains neither organic or aqueous components (e.g., electronic components), the material's solubility will be immaterial with respect to the application.

The particulate materials found useful herein rely on the high surface area and high porosity properties of the material. Materials must have these properties to be useful herein. These properties have been unexpectedly found to provide a means of providing high amounts of active oxygen scavenging metal useful for the purposes described herein. It is preferred that the material have substantially no ion exchange capacity with respect to the oxygen scavenging metal. They may, however, have small amounts of ionic exchange activity provided such activity does not provide a composition which exhibits metal by-product or salt leachability into the packaged product.

Representative of particulate materials which are insoluble in water and which may be used, singly or in combination, are metal oxides, sulfides, and hydroxides, such as those of silicon, aluminum, calcium, magnesium, barium, titanium, iron, zinc and tin; metal carbonates such as those of calcium and magnesium; minerals such as montonorillonite, kaolite, attapulgite, sepiolite, diatomaceous earth, talc and vermiculite; hydrotalcite synthetic and natural zeolites; precipitated metal silicates such as calcium silicate and aluminum polysilicate; alumina silica gels; activated carbon; aluminum phosphate; and the like. These materials are preferred for most applications.

Illustrative of low water soluble particulate material found useful herein are certain inorganic salts such as, for example sulfates such as those of calcium or potassium; phosphates such as those of calcium; and carbonates such as those of calcium; and the like. These materials are most useful in non-food applications.

As stated above, the particulate carrier material should have a high surface area and, therefore, have high porosity. The pore volume of the particulate should be at least about 0.07 cc/gm, with from about 0.1 to 4 cc/gm being preferred. The framework structure of the particulate material can be viewed as enclosed cavities which are linked by pore channels and both the cavities and channels have minimum pore diameter of at least 3 angstroms to thus permit free passage of sufficient moisture as well as oxygen molecules to the metal to initiate oxygen scavenging. The subject material either has or can be made to have, by known methods, the required surface area, pore volume and pore diameter dimensions.

The subject particulate material has been found to provide a desirable means of providing large amounts of oxygen scavenging metal to the subject composition and, thereby, provide enhanced capacity and activity to scavenge oxygen while not allowing the initial and resultant materials to adversely effect the color, taste or smell of articles in contact with the subject composition.

The subject particulate material should be impregnated with an oxygen scavenging metal compound or salt which can provide a metal coating therein, as fully described herein below.

Any metal that can be reduced substantially to the zerovalent state, and where that state is capable of reacting with molecular oxygen, is suitable for this invention. In practice, metals are selected that do not react with oxygen too quickly, as this would render the scavenger too difficult to handle. Furthermore, from a standpoint of food safety, metals of low toxicity are preferred. In general it is preferred to utilize a reduced metal of zero valence selected from calcium, magnesium, scandium, titanium, vanadium, chromium, manganese, iron, cobalt, nickel, copper, zinc or tin. The preferred metals are the transition metals of the Periodic Table forming the series from scandium to zinc (i.e., Sc, Ti, V, Cr, Mn, Fe, Co, Ni, Cu and Zn) with iron and copper being more preferred. Copper is especially preferred for use with this invention.

The metal loaded porous material can be formed by various known methods, such as incipient wetness impregnation utilized in forming various catalyst materials. In general, the process utilizes a highly concentrated solution of the metal compound (e.g., metal salt). Substantially saturated solutions are preferred. A volume of the solution is mixed with the porous material in a ratio of solution volume to material total pore volume of from 0.5 to 1.2 and preferably from 0.8 to 1 to permit substantially full impregnation and surface coating of the porous material's surface area. Once the impregnation is completed, the solvent is removed by subjecting the metal impregnated porous material to elevated temperature, reduced pressure or both to provide substantially complete coating of the metal compound on the surface area of the porous material. The material is then calcined at elevated temperatures, such as from about 200 to 500° C., to cause the metal salt or compound to be converted to its oxide. The material is then chemically treated to reduce the metal therein to its zero valence state or to its lower valence state or mixtures thereof. It is preferred to have the metal in its lowest (e.g., zero) valence state to further enhance the oxygen scavenging capacity and activity of the system. One method of accomplishing the reduction is to subject the impregnated porous material to elevated temperatures in the presence of hydrogen gas. The hydrogen should be present in from about 0.1 to 100% hydrogen (preferably 2–5%) of the atmosphere. The reduction can be also accomplished by high pressure using a reducing gas (e.g., carbon monoxide or hydrogen) and elevated temperature (pressurized system) techniques. This method provides the combined steps of metal reduction and calcined counterion removal.

Another method of forming the subject metal containing particulate material is by vapor deposition technique in which the porous material is subjected to the scavenger metal in its vapor state.

The resultant material has the metal coated throughout the porous material's surface area. The resultant material should have a major portion of the its surface area coated with metal and preferably at least about 60 percent and most preferably at least about 80 percent of the surface area is metal coated. Lesser coverage may be acceptable where it provides sufficient metal for a particular application's need. The coating may be in the form of a mono-atomic layer or may be a thicker coating. Thus, the upper limit of amount of metal contained within the carrier is limited only by its activity limitation. The exact degree of coating can be readily determined by one skilled in the art having the knowledge of the surface area of the porous material and the amount of metal contained therein. The higher the surface area, the lower the degree of coating is required to provide at least a minimal oxygen scavenging activity. However, the presently required high surface area particulate materials provide the ability to have an oxygen scavenger material of high capacity. Such capacity enables one to achieve extended storage capacity of the resultant packaged product. The amount of metal coated on a particulate material's surface area will depend on the anticipated application of the scavenging composition. Where large amounts of composition are used to scavenge small volumes of oxygen (such as in can coating applications), the amount of metal coated on the particulate material can be as low as about 0.5 wt percent of the particulate and preferably at least 1 wt percent of the particulate. However, in other conventional applications, such as cap liners and the like, where the loading of the particulate in the polymer carrier is low and/or the amount of composition is small, the amount of metal should be at least about 5 wt percent, preferably from 5 to 30 wt percent, more preferably from 10 to 30 wt percent and most preferably from 15 to 30 wt percent based on the weight of the coated particulate. The exact amount of metal required for a particular application can be readily determined by the artisan. The present invention provides a means of achieving a wide range of scavenger metal content including high weight percentages not readily attainable by other means.

The metal-loaded porous material described above is a finely divided solid that is particularly suited to replace part or all of the filler commonly found in sealant compositions which is an application contemplated herein. The subject composition as a whole is preferably anhydrous. Thus, it is preferred that the carrier component of the composition be a polymeric matrix which is also preferably anhydrous. Generally, the polymeric matrix substantially protects the scavenger from moisture under normal atmospheric conditions and, therefore the scavenger metal remains substantially inert to scavenging activity until high degrees of moisture are present as attained in a closed package environment. The polymer matrix should be sufficiently porous to permit moisture and oxygen to pass into the formed metal loaded porous particulate material.

In one embodiment of the present invention, the carrier of the subject composition comprises a polymeric matrix material, that is to say polymeric material that will form a solid matrix having distributed therein the metal coated, high surface area, microporous particulate material. The polymeric matrix material will be selected having regard to the nature of the composition (dispersion, latex, plastisol, dry blends, solution or melt) and its utilization as part of the container in a conventional manner.

The polymeric matrix material is chosen from at least one polymeric material that can form a solid, or semi-solid matrix. The polymeric matrix material can be derived from a variety of polymers which are available from a variety of bulk physical configurations such as dispersion, latex, plastisol, dry blend, solution, or melt (e.g., thermoplastic meltable polymer). The particular physical configuration of the polymer selected will depend on the end structure into which the subject composition is eventually formed or incorporated. The polymeric matrix is derived from polymer types which may be thermoplastic or thermosetting.

The primary functions served by the polymer matrix for purposes of the present invention are to provide a compatible carrier (a material which is stable under normal packaging temperature conditions and does not deactivate the oxygen scavenging ability of the metal coated active material) for the oxygen scavenging metal coated particulate material which is fully described herein above and to permit ingress of both oxygen and water into the composition and to permit them to come in contact with the oxygen scavenging metal. The scope of the polymer in general can be very broad. However, the polymer matrix may also be selected to perform additional functions depending on the physical configuration in which it is provided in a final structure into which it is shaped or incorporated. Thus, the particular polymer or mixture of polymers selected ultimately will be determined by the end use in which it exerts its oxygen scavenging effect.

Accordingly, suitable polymers from which the polymeric matrix may be derived include vinyl polymers, polyethers, polyesters, polyamides, phenol-formaldehyde condensation polymers, polysiloxanes, ionic polymers, polyurethanes, acrylics and naturally occurring polymers such as cellulosics, tannins, polysaccharides, and starches.

Suitable materials for use as the polymeric matrix component of latex compositions, e.g., for can ends, are described in U.S. Pat. Nos. 4,360,120; 4,368,828 and EP 0182674. Suitable polymeric materials for use when the compositions are organic solutions or aqueous dispersions are described in U.S. Pat. Nos. 4,360,120; 4,368,828; and GB 2,084,601. Suitable materials for use in thermoplastic compositions include the materials proposed in U.S. Pat. Nos. 4,619,848; 4,529,740; 5,014,447; 4,698,469; GB 1,112,023; GB 1,112,024; GB 1,112,025 and EP 129309. The teachings of each of the references cited herein above are incorporated herein by reference in their entirety.

In particular, the polymeric material can be generally selected from polyolefins as, for example, polyethylene, polypropylene, ethylene/propylene copolymers, acid modified ethylene/propylene copolymers, polybutadiene, butyl rubber, styrene/butadiene rubber, carboxylated styrene/butadiene, polyisoprene, styrene/isoprene/styrene block copolymers, styrene/butadiene/styrene block copolymers, styrene/ethylene/butylene/styrene block copolymers, ethylene/vinyl acetate copolymers, ethylene/acrylate and ethylene/(meth) acrylate copolymers (for instance, ethylene/butyl acrylate or ethylene/butyl methacrylate copolymers), ethylene/vinyl alcohol copolymers, vinyl chloride homopolymers and copolymers, styrene/acrylic polymers, polyamides, and vinyl acetate polymers, and blends of one or more of these. Polyethylenes found useful in forming the subject composition include high density polyethylene (HDPE), low density polyethylene (LDPE), linear low density polyethylene (LLDPE), ultra-low density polyethylene (ULDPE) and the like as well as copolymers formed from ethylene with one or more other lower alkenes (e.g., octene) and the like.

Particularly preferred compositions according to the invention utilize a polymeric matrix composed of thermoplastic polymer as, for example, polyethylene or copolymers of polyethylene such as, ethylene/vinyl acetate and the like or polyethylene blends such as, blends of HDPE and butyl rubber; polyethylene and ethylene/vinyl acetate copolymer; as well as polyethylene and styrene/butadiene/styrene block polymer and the like. The polyethylene, if used, is preferably a low density polyethylene, and may be a very low or ultra low density polyethylene which may be branched or linear. The ethylene/vinyl acetate copolymer, if used, preferably has a melt index in the range 3 to 15, preferably 5 to 10, and generally contains 5 to 40%, preferably 5 to 30%, vinyl acetate.

Further, a plastisol or a dry blend of polymer may be used in combination with a plasticizer for forming the polymer matrix. Suitable materials for use when the compositions are plastisols include vinyl chloride homopolymers and copolymers. Instead of preparing such compositions as true plastisols, they may be provided as dry blends of the polymer and plasticizer. The proportion of plasticizer present in a vinyl resin plastisol may be any conventional proportion, typically from 30 to 150 weight parts of plasticizer per hundred weight parts of vinyl resin.

The polymer carrier may be formed from various thermosetting resins such as polyurethanes, phenolics, epoxyester resins, epoxy resins, polyesters and alkyols. These resins are normally formed into solutions or suspensions with organic liquids and applied to the inner surface of a container followed by application of elevated temperature to remove the liquid and cause solidification (e.g., by crosslinking) of the resin coating on the substrate.

The polymeric matrix of the composition may further contain conventional plasticizers, including phthalates, adipates, glycols, citrates and epoxidized oils and the like. Examples include for example dioctyl phthalate, diisooctyl phthalate or diisodecyl phthalate, which are readily available. Other usable plasticizers are butyl benzyl phthalate, acetyl tributyl citrate, ethyl diphenyl phosphate and diisobutyl phthalate. One particularly useful combination of plasticizers for use with a vinyl chloride/vinyl acetate copolymer resin is a mixture of diisodecyl phthalate and diisooctyl phthalate in a weight ratio of about 7–8:1.

A preferred aspect of the invention is that the scavenger should remain substantially inert in the composition and in the gasket or other solid deposit formed with the subject composition until the composition is on or in a sealed container. Exposure of the composition to high humidity that normally exists within a sealed container will, therefore, result in sufficient permeation of moisture into the composition and the subject oxygen scavenger to initiate a satisfactory degree of scavenging and result in improved shelf life of the packaged material. In addition, the scavenging reaction can be accelerated by heating the composition sufficiently while in the closed container to cause increased permeation of moisture. Thus, preferably the scavenger metal is a material that remains substantially inert in the carrier until the scavenging reaction is accelerated by heating in the presence of moisture.

Preferably the scavenging reaction of the present composition is accelerated by pasteurizing (typically at 50°–100° C.) or sterilizing (typically at 100°–150° C.) the container after filling it with an aqueous fill and sealing it. This triggering appears to be a consequence of the subject composition, when heated, permitting moisture to permeate into the composition and contact the subject scavenger particulate material. The moisture becomes trapped in the composition, thereby bringing the scavenger into contact with sufficient water to permit reaction with oxygen. This oxygen may permeate through the composition either from oxygen trapped within the container when it was filled or which subsequently enters the container from the surrounding atmosphere.

The polymeric matrix of the subject compositions may further contain inert filler, slip aids, process aids, pigments, stabilizers, anti-oxidants, tackifying resins, foaming agents and other conventional additives in conventional amounts, depending upon the nature of the composition and its final use. If the polymer matrix is part of a thermoplastic composition, the total amount of such additives is generally below 10%, most preferably below 3%, based on the total weight of the composition. However, when the composition is a plastisol, dispersion, organic solution or latex, the amounts of additives based on polymeric material may be higher. When an anti-oxidant is incorporated, it should be present in amounts capable of stabilizing the polymeric composition against degradation due to free-radicals formed during processing. However, the amount of anti-oxidant should be small enough to permit the oxygen scavenger component of the composition to effectively react with molecular oxygen. The specific amount will depend on the anti-oxidant used and can be determined by minor experimentation.

The composition of the invention may be formulated in any convenient form, such as a melt, plastisol, organic solution, dry blend, latex or dispersion. The main ingredients of the composition, apart from the oxygen scavenger metal coated particulate material, are normally typical of those conventionally present for the intended purpose. It is preferred that the total composition should be non-aqueous (i.e., an anhydrous solution, plastisol or thermoplastic melt) so as to prevent initiation of the reaction of the scavenger within the composition. Alternatively, the scavenger may be encapsulated in a carrier sufficient to prevent it from contacting water until within the closed environment of the container.

The polymer matrix carrier of the subject composition may be selected from those used to form coatings on at least a portion of the interior surface of a package (e.g., a rigid container such as a can, can lid, box or the like). The polymer matrix can be selected from polymer classes commonly referred to as epoxides, phenolics (e.g., phenolformaldehyde condensation polymer), lacquers (e.g., cellulose esters or ethers, shellac, alkyl resins and the like), polyurethanes and the like. The carrier matrix may be mixed with metal coated particulate material to provide an encapsulated particulate which may be subsequently used in a second polymer matrix or applied onto (such as by solvent or melt application) the surface of a second carrier material.

The present composition is particularly suitable for use with materials conventionally used to coat the inner surface of containers (e.g., cans) in which the coating requires application of heat to drive off solvent and/or to cure the carrier material. For example, lacquers, epoxy resins and the like may be coated on the inside of metal can surfaces as a protective coating. To cure the coating, the treated can is subjected to elevated temperatures for short periods of time to remove solvent and cure the coating prior to filling and sealing the can. Conventional oxygen scavengers composed of oxidizable organic compounds are not suitable as part of such curable coating material as they are known to degrade and loose their scavenging activity under elevated temperatures normally required for such curing steps. The present composition is particularly suitable for such application as the scavenger is stable at the high curing temperatures. For example, the carrier can be a polymer matrix formed of an organic lacquer such as composed of a cellulosic ether or ester, alkyl resin or mixtures thereof in a solvent such as, for example, an alcohol (e.g., $C_1$–$C_3$ alkyl alcohol), a ketone (e.g., methyl ethyl ketone), an acetate (e.g., butyl acetate) or an aromatic (e.g., toluene, xylene) or mixtures thereof. The metal-loaded porous carrier material of the subject invention is stable (does not degrade or lose oxygen-scavenging activity when subjected to the elevated temperatures contemplated for curing process) can be used as the oxygen scavenger component in such applications.

The subject composition can also be utilized to form a film which carries the present oxygen scavenger metal porous carrier material. The carrier can be formed from a polymeric material, such as those described herein above, capable of forming a film and upon the surface thereof is deposited the present oxygen scavenger. The surface of the film can be coated with the subject oxygen scavenger metal loaded carrier material by forming a suspension or dispersion of its powder in a polymer and depositing the suspension or dispersion by a conventional means, such as spraying or knife coating application or the like, directly onto the surface of the carrier film. The particular nature of the carrier film will depend upon the application contemplated and the ability of the carrier formed to have the oxygen scavenger adhered to its surface and substantially retain its integrity during use.

The carrier can, alternately, be in the form of a fibrous (woven or non-woven) mat. The subject oxygen scavenger composition is contained in the interstices of the mat structure. The fibers forming the mat may be formed from any suitable material or synthetic fiber such as cotton, glass, nylon, polyethylene, and copolymers of ethylene with one or more ethylenically unsaturated monomer, polypropylene and copolymers of propylene with one or more ethylenically unsaturated monomer and the like. The particular nature of the carrier mat will depend upon the application of its use and the ability of the mat to retain oxygen scavenger material within the interstices of the mat structure during use. The scavenger can be deposited into the mat structure by any means such as by dipping the mat into a dispersion or suspension of the scavenger and then removing the liquid from the mat or by first forming particulates of scavenger/polymer composition which is melt deposited onto and into the mat structure.

In another embodiment, the subject oxygen scavenger composition can be retained within a carrier in the form of a pouch or sachet of suitable size to be inserted in a container having an oxygen sensitive material therein. The pouch or sachet should be sufficiently porous to permit moisture and oxygen to penetrate through the pouch or sachet forming material at ambient temperature conditions. The subject oxygen scavenger composition thus composed of the pouch or sachet carrier having therein the metal loaded porous particulate carrier, per se, or further contained in a polymer carrier and provided for in the form of small particles of sufficient particulate size to permit the sachet structure to retain the oxygen scavenger therein. The pouch or sachet can be formed from natural or synthetic materials such as paper, cotton cloth, polymer films and the like in manners well known to the packaging technology.

A fourth embodiment is to utilize a carrier in the form of a porous inorganic material, such as a ceramic having the oxygen scavenger metal loaded porous particulate material distributed therein. The ceramic can be formed into any desired shape (e.g., spheres, cubes, cylinders and the like) and size which is suitable for insertion into the container having the oxygen sensitive material. Useful porous inorganic materials include clay, cement pastes and the like.

An essential feature of the invention is that the subject composition contains the above described metal loaded oxygen scavenger high surface area porous particulate in a form suitable to react with gaseous oxygen. The oxygen scavenger herein is a metal in its zero or low valence state which reacts with gaseous oxygen in the presence of moisture.

It has been found that the above described metal coated high surface area materials having a metal in its zero-valence state as part of the material configuration, while in a carrier, can be used as oxygen scavenger compositions. The resultant composition can be used for the preservation of oxygen sensitive foods stored at ambient conditions. The present compositions have an advantage over those compositions containing organic oxygen scavengers (such as ascorbates and unsaturated hydrocarbons) because they do not produce organic oxidation by-products which may contaminate the food material. Still further, water-soluble salts normally used in conjunction with oxygen scavengers to increase the scavenging rate are not required. Further, the present compositions exhibit minimal migration of metal ion, metal by-products or metal salts into aqueous solutions. Therefore, the present invention unexpectedly provides a highly desired oxygen scavenger composition which does not cause discoloration or detract from taste of the packaged food product.

The oxygen scavenger material of the present invention is a high surface area, porous, particulate material that has a major portion of its surface coated with a substantially zero-valent metal. It has been found that the nature of the system is such that large amounts of the metal are supported by the porous material in a manner which causes the metal to be highly reactive with molecular oxygen yet to be entrapped in a manner which prevents migration of the metal or the oxidized product into the packaged material.

It may be desirable to include in the composition a material, for instance a surfactant such as sodium dodecylbenzene sulphonate, which will increase the permeability of the composition to water and a suitable amount of a surfactant such as this is between 0.1 and 1.0% by weight.

The amount of the subject scavenger metal containing particulate is dependent on the type of application. When the particulate is incorporated into a gasket, the amount is normally at least 0.5 weight percent based on the polymeric matrix material, generally at least 1% and preferably at least 2%. It is generally unnecessary for the amount to be above 20% and 4%–10% is often a convenient maximum.

In the case of a plastisol, lacquer, or hot melt applied to the center panel of a closure, where the matrix does not otherwise serve as a gasket, scavenger particulate loadings can be much higher. For example, loadings of 20 weight percent to 60%, or in some cases up to 90% are workable.

When the composition is in the form of a film, mat, pouch or sachet, the oxygen scavenger should be present in an amount to effectively scavenge oxygen during the contemplated storage period of the container for the appropriate contents. An amount in the range of from 0.01 to 2 grams of the metal containing porous particulate is normally sufficient to provide desired oxygen scavenging capacity in a normal size (50–1000 ml) container.

The present composition can be used as part of a package container which can provide storage stability to the material packaged therein without detracting from the material's taste, odor or smell. The present composition should be exposed to the inner atmosphere of the resultant sealed container in any form such as a coating on all or a part of the inner surface of the container body or closure means (e.g., lid, can end) or as an insert in the form of a film, mat, pouch, sachet or ceramic structure.

The invention formed with a polymer matrix in the form of a film can be applied as a center panel lining on a container closure. The closure can be a cap, can end, lid stock or film. The invention also includes container closures carrying a solid deposit formed on the closure from a polymer matrix or film composition and that is positioned to seal around, or over a line of weakness in, the closure. The solid deposit can be a gasket deposited around the closure and formed from the composition. Instead of, or in addition to the deposit being such a gasket, the composition can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus, the area of the solid deposit can be very small relative to the area of the container. Despite this, the invention can give greatly improved storage stability to the contents.

The invention also includes filled containers sealed with such closures. The sealed container comprises a container body, the closure fitted on it, and the packaged material that is contained within the container body. The container body is preferably of glass or metal. The closure is preferably of metal. The packaged material can be any beverage, foodstuff or other material that is to be stored within the container but the invention is of particular value when the filling is a material whose shelf-life or product quality is normally restricted due to oxygen ingress or contamination during storage. The container body can be a can, generally of metal, in which event the closure is a can end. Generally the entire closure is of metal or polymeric material but the panel of the closure can include a removable component of either metal or polymeric material.

Instead of a can body, the container body can be a bottle or jar in which event the closure is a cap. The bottle or jar is preferably of glass but it can be of polymeric material with very low oxygen permeability. The cap can be of polymeric material, for instance a polypropylene, that may include a barrier layer. Generally, the cap is formed of metal and may include a push or pull component of metal or polymeric material. The cap may be a crown cap such as a pry-off or twist-off crown, a twist-on cap, lug cap, press-on/twist-off, or press-on/pry-off cap, a screw-on cap, roll-on metal cap, continuous thread cap, or any other conventional form of metal cap or polymeric cap suitable for closing the bottle or jar.

A gasket is normally provided between the container body and the closure. This gasket can be used to carry the composition of the invention (in particular, as a polymer matrix containing composition) either as a blend in the gasket composition or as a separate component applied on or near the gasket but it is possible for the composition of the invention to be utilized elsewhere on the closure or elsewhere in the container. In that event the gasket-forming composition can be any unaltered conventional composition suitable for forming the gasket.

When the closure is a cap, the subject scavenger composition may form an overall gasket or a portion of an overall gasket. This is typically true for small diameter caps such as those less than 50 mm in diameter. For large diameter caps, the gasket is a ringlike gasket and may be deposited in a conventional manner from the gasket-forming composition. For instance, a ringlike gasket can be formed on a cap by being applied in liquid form as a ring and can then be converted to solid form by drying, heating to cure or cooling to set a thermoplastic, as appropriate. The oxygen scavenging composition could be blended into the gasket material, deposited on the gasket material, or applied to an area of the cap not covered by the gasket (the center panel). The gasket-forming composition may, for this purpose, be a dispersion, latex, plastisol, dry-blend, suitable thermoplastic composition or organic solution. The cap, carrying the gasket, is then pressed on to an appropriate sealing face around the open end of the filled container body and closed in conventional manner.

If the composition is formed with a thermoplastic polymer matrix, it may be applied as a low viscosity melt while the cap is spinning, so as to throw the composition into the form of a ring, or it may be applied as a melt which is then molded into the desired shape, often a disc having a thickened ring-like portion. Further, the gasket can be in the form of a pre-formed ring or disc which is retained (e.g., by mechanical or adhesive means) within the cap.

If the closure is a can end, the oxygen scavenging material is typically not used in the gasket composition because, under typical can seaming conditions, the gasket is not substantially exposed to oxygen in the pack. Also, the seams are not particularly vulnerable to oxygen ingress. The oxygen scavenging material is typically applied on a center panel or other interior surface in the can, such as applied as a coating of a can.

It is particularly preferred that the gasket or coating on the container closure be formed by applying a fluid or molten composition of the present invention formed with a polymer matrix and solidifying it on the closure. The method of application and solidification is generally conventional. It is particularly preferred that the container and can end should both be of metal or the container body should be of glass and the closure of metal or plastic, since the use of the defined compositions for forming the gasket then appears to give particularly beneficial results. In particular, excellent results are achievable when the container body is a glass bottle and the closure is a metal cap.

Instead of or in addition to using the fluid or meltable polymer matrix composition of the invention for forming a gasket, it is possible to deposit the composition elsewhere on the inner face of the closure. It may be applied as an overall coating of the inner face of the panel of the closure or it may be applied over only part of the inner face. In particular, when the panel includes one or more push or pull components defined in the panel by discontinuities or lines of weakness the composition may be applied primarily to cover just the discontinuity or line of weakness.

For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. In particular, the composition of the first embodiment of the present invention may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal panel. This can expose the metal to corrosion. Application of a composition of the present invention to a container as described herein can both inhibit corrosion of the metal container as well as improve storage stability of the contents of the container, especially water bearing contents, such as beer.

In addition to use in metal, glass and plastic containers, the compositions can be used in a cardboard or laminated container such as a juice box. Such a container is a cardboard carton or tube with an interior liner. The composition can be placed in or layered with the interior liner of the cardboard package, along a line of weakness at the package closure, or at any other convenient location in the package. Alternately, the present composition can be placed within the container as a film, mat or sachet.

Further, the composition of the present invention can be compounded and extruded into desired shapes when the polymer matrix is a thermoplastic resin. For example, the subject compositions can be formed into films per se or as a component of a film composition used to prepare flexible packaging, such as bags, or the films can be laminated onto metal stock which can then be formed into cans and closures. Also, the compositions may be included in flexible packaging such as multilayer films or laminates or as a ribbon, patch, label or coating on a thermoplastic bag or lidstock. When the subject composition is part of a multilayer film, the layer formed of the present composition should be the surface layer which will be exposed to the inner surface of the resultant flexible package or should be an inner layer which is covered by a surface layer having high porosity to permit the $O_2$ and moisture to penetrate into and contact the layer containing the present composition. Thus, the term "exposed to the interior", as used herein and in the appended claims shall mean either direct or indirect exposure of the subject composition to the inner atmosphere of a sealed container having packaged product contained therein.

The compositions can also be used in conjunction with or as a portion of a tamper-evident membrane for pharmaceuticals and foods.

The following examples are given for illustrative purposes only and are not meant to be limiting or limiting the claims which are appended hereto. All parts and percentages are by weight unless otherwise indicated.

EXAMPLE 1

Cu Impregnated $TiO_2$

A solution was prepared containing 45.4 parts $Cu(NO_3)_2$ 2.5 $H_2O$ and 54 parts of distilled water. The resultant solution was then added to 100 parts $TiO_2$ having a surface area of 108 $m^2/g$ and a pore volume (Hg porosimetry) of 0.4 cc/cc (Kemira 908) and mixed until uniform to provide incipient impregnation of the $TiO_2$. The pore volume to soluton volume was about 1:1. The material was then dried overnight at 100° C. followed by calcination at 400° C. for 2 hours. Six parts of the calcined powder were placed in an alumina boat in a controlled atmosphere furnace and reduced for 26 hours in a flowing atmosphere of 4 wt % $H_2$ in $N_2$ at 400° C. The resultant material had copper metal coating on the majority of the titania's surface area. The copper was 12 weight percent of the resultant particulate.

EXAMPLE 2

Cu Impregnation Silica

A solution was prepared containing 45.4 parts $Cu(NO_3)_2$ 2.5 $H_2O$ and 280 parts of distilled water. The resultant solution was then added to a mixture of 32.9 parts silica having a surface area of 250 $m^2/g$ (Cabosil MS-75) and 67.1 parts silica having a surface area of 200 $m^2/g$ (Cabosil M-5) and mixed until uniform to provide incipient impregnation of the silica. The pore volume to solution volume was about 1:1. The material was dried overnight at 110° C. followed by calcination at 400° C. for 2 hours. Six parts of the calcined material were placed in an alumina boat in a controlled atmosphere farance and reduced for 4 hours in a flowing atmosphere of 4 wt % $H_2$ in $N_2$ at 400° C. The resultant copper coated silica had a copper content of 9.8 wt % which coated a major portion of the silica's surface area

EXAMPLE 3

Cu Impregnated Kaolin Clay

A solution was prepared containing 45.4 parts $Cu(NO_3)_2$ 2.5 $H_2O$ and 19.0 parts of distilled water. The resultant solution was then added to 100 parts Kaolin clay having a surface area of 21 $m^2/g$ and a pore volume of 0.02 cc/g ($N_2$ BET method) (Natka) and mixed until uniform to provide incipient impregnation of the clay. The pore volume to solution volume was about 1:1. The material was dried overnight at 110° C. followed by calcination at 400° C. for 2 hours. The calcined material was ground with a mortar and pestle to provide a fine powder product. Six parts of the powder were placed in an alumina boat in a controlled atmosphere furnace and reduced for 4 hours in flowing 4 wt % $H_2$ in $N_2$ at 400° C. The resultant clay material had a copper coating on the major portion of its surface and was 10.2 wt % of the product.

EXAMPLE 4

CU Impregnated USY Zeolite

A solution was prepared containing 90.8 parts $Cu(NO_3)_2$ 2.5 $H_2O$ and 33.6 parts of distilled water. The resultant solution was then added to 100.0 parts USY type zeolite having a surface area of 750 $m^2/g$ (Ultastable Y zeolite) and mixed until uniform to provide incipient impregnation of the zeolite. The pore volume to solution volume used was about 1:1. The material was dried overnight at 110° C. followed by calcination at 400° C. for 2 hours. The calcined material was ground with a mortar and pestle to provide a fine powder product. Six parts were placed in an alumina boat in a controlled atmosphere furnace and reduced for 7 hours in flowing atmosphere of 4 wt % $H_2$ in $N_2$ at 400° C. The resultant zeolite had a copper coating over the major portion of its surface and was 24.8 weight percent of the product. Although this zeolite has some ion exchange capacity, such capacity is small in comparison to the amount of copper coating contained therein.

EXAMPLE 5

Cu Impregnated Steamed Acid-Extraced (SAE) USY Zeolite

Ninety parts of USY Zeolite was placed in ceramic dishes in a controlled atmosphere furnace and steamed treated with 95% steam for 1 hour at 816° C. The steamed materials (65 parts) was then refluxed in 3M HCL for 3 hours. After cooling, the material was filtered, washed three times with 650 parts distilled water, and dried at 103° C. overnight. The steaming and acid refluxing served to remove the aluminum from the USY zeolite, leaving behind a crystalline silica only zeolite material with virtually no ion exchange capacity.

A solution was prepard containing 7.16 parts $Cu(NO_3)_2$ 2.5 $H_2O$ and 9.6 parts of ethylene glycol. The resultant solution was then added to 20 parts steamed-acid extracted USY zeolite and mixed until uniform to provide incipient impregnation of the (SAE) USY zeolite. The pore volume to solution volume was about 1:1. The material was then dried at 100° C. for 10 hours, calcined at 200° C. for 30 minutes followed by increasing the temperature to 450° C. in 1.25 hours and holding at 450° C. for 4 hours. The calcined powder was placed in an alumina boat in a controlled atmosphere furnace and reduced for 24 hours in flowing atmosphere of 4 wt % $H_2$ in $N_2$ at 350° C. The resultant material had a copper coating over the major portion of its surface and was 9.8 weight percent of the product.

EXAMPLE 6

The materials formed by Example 1–5 above were tested for their oxygen scavenging properties by the following procedure. 0.5 part of a material was placed in a gas impermeable container having 100 cc of ambient air ("dry conditions") and a second 0.5 part of the material was placed in a gas impermeable container with 100 cc of ambient air and 2 cc of water ("wet conditions"). 3 ml gas samples were removed from each container at spaced time intervals and analyzed for oxygen. The results of each pair of samples (dry/wet) is shown in FIGS. 1 to 5, respectively. The results show that each material has good stability under ambient conditions while providing high oxygen scavenging capacity when triggered initiation by the presence of moisture.

EXAMPLE 7

Figure 6:
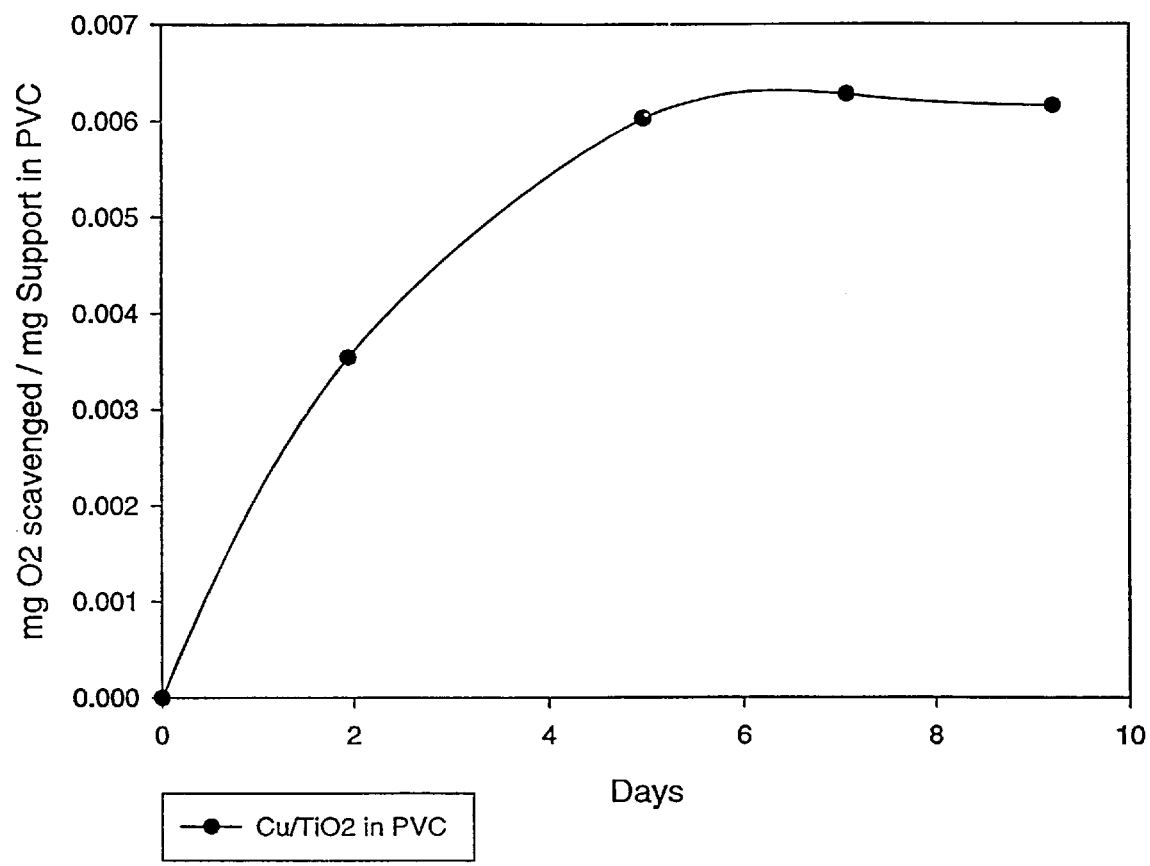
FIG. 6 is a graphic depiction of the oxygen scavenging activity of a scavenging composition according to the present invention.

This experiment was conducted by compounding 4.5 parts of a material prepared according to Example 1 (except the material was reduced 7 hours at 400° C.) with 40.5 parts of plasticized polyvinyl chloride in a Brabender compounder for 5 minutes at 150–160° C. Five parts of the resultant mixture was hot pressed into a 5–10 mil thickness film and placed in a gas impermeable container containing 100 cc air and 2 cc water. Three milliliter gas samples were taken at various times from the container and analyzed for oxygen content using a Mocon (Model HS751) gas analyzer. The results are given in FIG. 6.

What is claimed:

1. An oxygen scavenging composition comprising a polymeric matrix carrier having substantially uniformly distributed therein a metal-coated, inert, high surface area, porous particulate material having substantially no ion-exchange capacity with respect to the metal, a surface area of from about 1 to 950 meter square per gram and a pore volume of at least about 0.07 cc/gm and wherein said metal is substantially in its zero valence state, forms a coating on a major portion of the particulate material's surface area and is selected from the group consisting of calcium, magnesium, scandium, titanium, vanadium, chromium, manganese, iron, cobalt, nickel, copper, zinc, tin and mixtures thereof.

2. The composition of claim 1 wherein the metal coated porous particulate material is formed by vapor deposition.

3. The composition of claim 1 wherein the porous particulate material is a water insoluble material selected from the group consisting of metal oxides, sulfides or hydroxides, metal carbonates, minerals, synthetic and natural zeolites, metal silicates, alumina silica gels, carbon, aluminum phosphate, and mixtures thereof.

4. The composition of claim 3 wherein the porous particulate material is selected from the group consisting of oxides and hydroxides of silicon, aluminum, calcium, magnesium, barium, titanium, iron, zinc, tin and mixtures thereof.

5. The composition of claim 3 wherein the porous particulate material is selected form the group consisting of the minerals of montmorillonite, kaolite, attapulgite, sepiolite diatomaceous earth, talc, vermiculite and mixtures thereof.

6. The composition of claim 3 wherein the porous particulate material is selected from the group consisting of synthetic and natural zeolites.

7. The composition of claim 1 wherein the metal coated porous particulate material is formed by the steps comprising incipient impregnation of a solution of metal compound, removal of solvent, and reduction of the metal compound to provide metal coating wherein the metal is substantially in its zero valence state.

8. The composition of claim 7 wherein the porous particulate material is a water insoluble material selected from the group consisting of metal oxides, sulfides or hydroxides, metal carbonates, minerals, synthetic and natural zeolites, metal silicates, alumina silica gels, carbon, aluminum phosphate, and mixtures thereof.

9. The composition of claim 8 wherein the porous particulate material is selected from the group consisting of oxides and hydroxides of silicon, aluminum, calcium, magnesium, barium, titanium, iron, zinc, tin and mixtures thereof.

10. The composition of claim 8 wherein the porous particulate material is selected form the group consisting of the minerals of montmorillonite, kaolite, attapulgite, sepiolite diatomaceous earth, talc, vermiculite and mixtures thereof.

11. The composition of claim 8 wherein the porous particulate material is selected from the group consisting of synthetic and natural zeolites.

12. The composition of claims 1, 7, 2, 3, 8, 4, 9, 5, 10, 6 or 11 wherein the coated metal is selected from the group consisting of iron, copper, zinc, magnesium, tin, nickel or mixtures thereof.

13. The composition of claim 12 wherein the metal is copper.

14. The composition of claims 1, 7, 2, 3, 8, 4, 9, 5, 10, 6 or 11 wherein the carrier comprises a polymer matrix having at least about 0.1 weight percent of said metal-coated, inert, high surface area porous particulate material distributed therein based on the weight of the polymer matrix.

15. The composition of claim 14 wherein the polymer matrix comprises one or more vinyl chloride resin.

16. The composition of claim 14 wherein the carrier comprises a film or mat having said metal coated porous particulate material contained on the surface thereof.

17. The composition of claim 14 wherein the polymer matrix is a thermoplastic resin having from about 0.1 to 20 parts by weight of said porous particulate material based on the weight of polymer matrix.

18. The composition of claim 17 wherein the thermoplastic resin is selected from the group consisting of polyethylene, ethylene/vinyl acetate copolymers, vinyl chlorides homopolymers, vinyl chloride copolymers and blends thereof.

19. The composition of claim 17 wherein the polymer matrix comprises polyethylene selected from the group consisting of high, low, very low, ultra low, and linear low density polyethylenes, blends thereof and blends of said polyethylene with other polymers.

20. The composition of claim 17 wherein the polymer matrix comprises a mixture of at least one polyethylene and at least one ethylene/vinyl acetate copolymer.

21. The composition of claim 17 wherein the polymer matrix comprises a polymer selected from the group consisting of polyolefin, ethylene/vinyl acetate copolymer, butyl rubber, styrene/butadiene rubber, styrene/butadiene/styrene block copolymers, isoprene, styrene/isoprene/styrene block copolymers styrene/ethylene/butylene/styrene block copolymers, and mixtures thereof.

* * * * *